US 6,551,040 B1

(12) United States Patent
Terry et al.

(10) Patent No.: US 6,551,040 B1
(45) Date of Patent: Apr. 22, 2003

(54) BLIND FASTENER WITH A BLIND SIDE HEAD HAVING A CLAMP SUPPORT AND LOCK SECTION

(75) Inventors: William W. Terry, Waco, TX (US); David J. Fulbright, Waco, TX (US); Donald C. Busby, Waco, TX (US)

(73) Assignee: Huck International, Inc., Tucson, AZ (US)

( * ) Notice: Subject to any disclaimer, the term of this patent is extended or adjusted under 35 U.S.C. 154(b) by 0 days.

(21) Appl. No.: 10/034,666

(22) Filed: Dec. 27, 2001

(51) Int. Cl.[7] .......................... F16B 13/04; F16B 13/06
(52) U.S. Cl. ........................ 411/43; 411/45; 411/70
(58) Field of Search ..................... 411/43, 45, 46, 411/48, 69, 70

(56) References Cited

U.S. PATENT DOCUMENTS

| 3,148,578 A | 9/1964 | Gapp |
| 3,288,016 A | 11/1966 | Reynolds |
| 3,702,088 A | 11/1972 | Schmitt |
| 3,880,042 A | 4/1975 | Binns |
| 4,355,934 A | 10/1982 | Denham et al. |
| 4,405,273 A | 9/1983 | Ruhl |
| 4,473,914 A | 10/1984 | Haft |
| 4,627,775 A | 12/1986 | Dixon |
| 4,639,179 A | 1/1987 | Wollar |
| 4,784,551 A | 11/1988 | Kendall |
| 4,844,673 A | 7/1989 | Kendall |
| 4,863,325 A | 9/1989 | Smith |
| 5,102,274 A | * 4/1992 | Norton et al. ............... 411/43 |
| 5,569,006 A | * 10/1996 | Alvarado et al. ............ 411/43 |
| 5,603,592 A | 2/1997 | Sadri et al. |
| 6,077,009 A | * 6/2000 | Hazelman .................. 411/43 |

* cited by examiner

Primary Examiner—Neill Wilson
(74) Attorney, Agent, or Firm—Harness, Dickey & Pierce, P.L.C.

(57) ABSTRACT

A two piece blind fastener for securing a plurality of workpieces including a hollow sleeve having an enlarged sleeve head at one end and a pin having an enlarged shear ring at the end opposite the sleeve head followed by an elongated retention portion of reduced diameter. The shear ring is adapted to engage and move inside the sleeve to form a tuliped shaped blind head in response to a relative axial force applied between the pin and sleeve and to shear off proximate to the inner or blind sheet line of the workpieces. The retention portion is then moved with the pin shank into the shear ring and with the shear ring finally located at a position on the retention portion depending upon the overall thickness of the workpieces. This provides a clamp and lock section between the pin and sleeve at the inner or blind side of the workpieces. The pin and sleeve have a lock structure actuated after final formation of the clamp and lock section to provide a lock between the pin and sleeve.

31 Claims, 8 Drawing Sheets

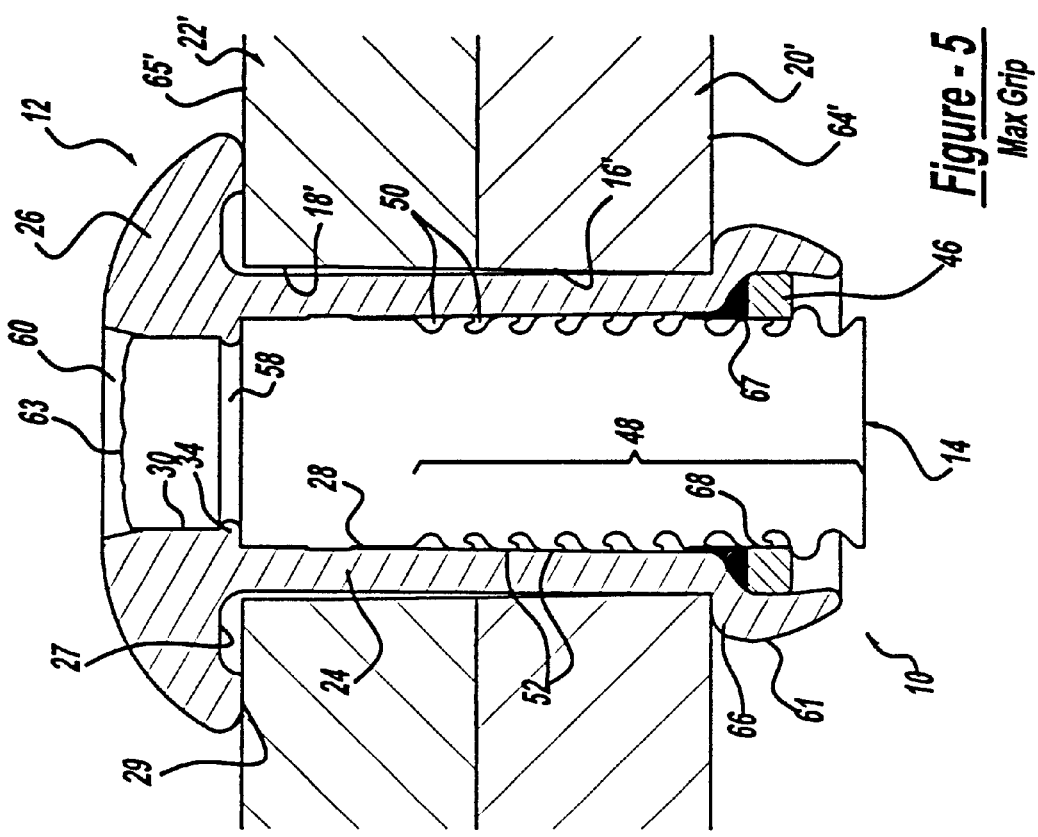
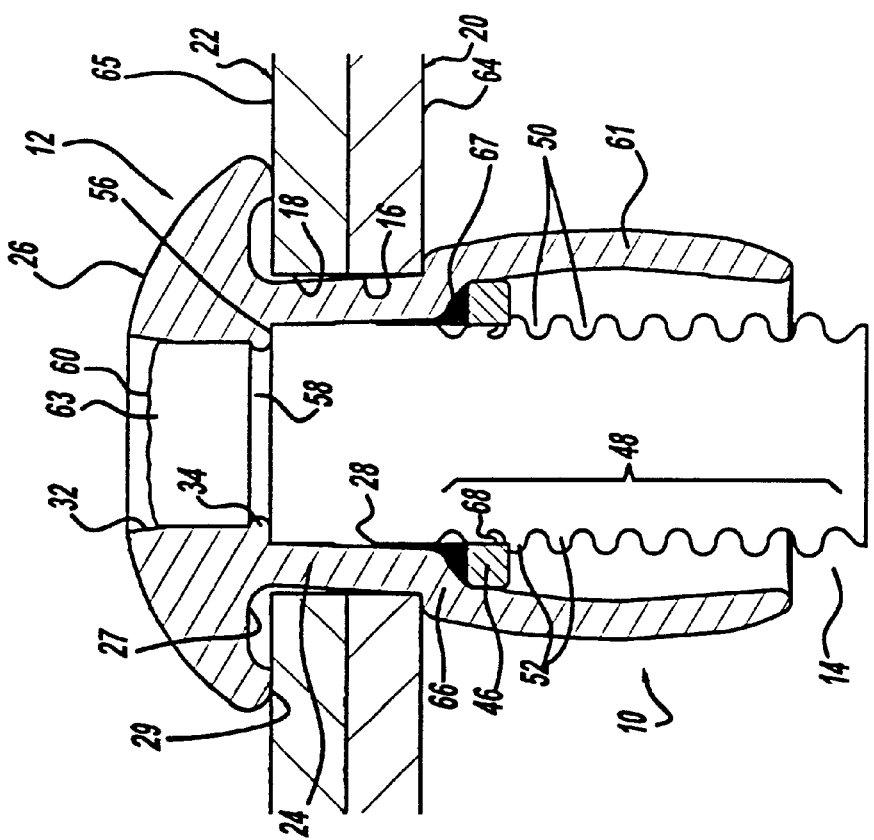
*Figure - 5*
Max Grip
*Figure - 4*
Min. Grip

Min. Grip

Max Grip

BLIND FASTENER WITH A BLIND SIDE HEAD HAVING A CLAMP SUPPORT AND LOCK SECTION

FIELD OF THE INVENTION

The present invention relates to blind fasteners including a pin and a sleeve and installed by the application of a relative axial force between the pin and sleeve.

BACKGROUND OF THE INVENTION

The present invention relates to blind fasteners and more particularly to blind fasteners including a pin (or spindle) and a sleeve with the pin having a head segment adapted to move into the shank of the sleeve at the blind side to form an enlarged tulip shaped blind head having a clamp support and lock section at the blind side and with the pin and sleeve having a second, mechanical lock structure at the opposite end for locking the pin and sleeve together, In many blind fasteners blind heads are formed of an enlarged tulip shape. Examples of such blind fasteners can be seen in U.S. Pat. No. 4,863,325 for Two Piece Blind Fastener With Lock Spindle Construction issued on Sep. 5, 1989 to Walter Smith, U.S. Pat. No. 4,627,775 for Blind Fastener With Grip Compensating Means issued on Oct. 9, 1986 to Richard Dixon, and U.S. Pat. No. 4,405,273 issued Sep. 20, 1983 to Ruhl et al for Blind Fasteners. This is in contrast to other blind fasteners in which blind heads are formed of a bulbed type. Examples of such blind fasteners can be seen in U.S. Pat. No. 4,784,551 for Fastening System And Method For Flush And Protruding Head Blind Fasteners issued on Nov. 15, 1988, to James Kendall and U.S. Pat. No. 5,603,592 for High Strength Blind Bolt issued on Feb. 18, 1997 to Sadri et al. The '592 patent shows a combination bulb and tulip type blind head. See also the MAGNA-BULB® type fastener shown in FIGS. 7–9.

The present invention is directed to a unique form of blind fastener for forming an enlarged tulip shaped blind head with a clamp support and lock section.

SUMMARY OF THE INVENTION

In the present invention a blind fastener (including a pin and a sleeve) is provided with the pin having a pin shank with a head segment at one end and with the sleeve having a sleeve shank and a sleeve head at one end. The head segment of the pin has an enlarged shear ring adapted to be moved into the shank of the sleeve at the blind side to form an enlarged tulip shaped blind head. The head segment of the pin has a retention portion having a plurality of retention grooves and crests following the shear ring. The shear ring is adapted to shear at a preselected magnitude of relative axial force after the blind head is fully formed and the shear ring is located adjacent the inner or blind side of the workpieces. Now the rest of the pin will continue to be pulled into the sleeve with the number of retention grooves and crests being moved through the shear ring depending upon the overall thickness of the workpieces. The shear ring will be engaged with one of the retention grooves and crests to form, with the adjacent, enlarged retention portion of the sleeve shank, the blind head having a clamp support and lock section at the blind side. At the same time the movement of the pin has continued until stop shoulders of the pin and sleeve are engaged and a mechanical lock is formed at the opposite end after which the pin will be severed at a breakneck groove to remove a pull portion from the shank of the pin. As will be seen the fastener of the present invention provides a blind head of a substantially uniform high strength over a typical, substantial grip range or range of total thickness of workpieces being secured together.

It should be noted that a blind fastener having a shear ring in combination with a plurality of retention grooves to form a blind head has been utilized in a blind fastener made by Huck International, Inc. and sold under the registered trademark MAGNA-BULB®. There, however, the shear ring does not enter the sleeve to form an enlarged tulip shaped blind head but, as noted, rather forms a bulb type blind head adjacent the inner or blind side surface and in addition, as will be seen, the retention groove structure is also somewhat different. Other significant differences will also be seen.

One form of the blind fastener of the present invention has a unique protruding sleeve head structure with engaging surfaces providing a relatively high level of stress concentration with the engaged surfaces of the workpieces being secured together. This provides a high level of resistance to slippage between the workpieces and the installed fastener. Such a construction then lends itself to use in applications where there is some gap between the workpiece openings and the installed fastener.

Thus it is an object of the present invention to provide a novel blind fastener, including a pin and a sleeve, and in which the pin and sleeve have a structure for forming an enlarged, tulip shaped blind head with a lock between the pin and sleeve at that end.

It is another object of the present invention to provide a blind fastener having a unique structure for forming a blind head.

It is still another object of the present invention to provide a blind fastener having a unique structure for forming an enlarged, tulip shaped blind head with a clamp support and lock section at that end.

It is still another object of the present invention to provide a blind fastener having a unique structure for forming an enlarged, tulip shaped blind head with a clamp support and lock section at that end and being of a generally uniform configuration and high strength over a substantial grip range.

It is also an object of the present invention to provide a blind fastener having a unique protruding sleeve head for providing a high level of resistance to slippage between the workpieces being secured together and the installed fastener.

It is a general object of the present invention to provide a new and improved blind fastener.

Other objects, features, and advantages of the present invention will become apparent from the subsequent description and the appended claims, taken in conjunction with the accompanying drawings.

BRIEF DESCRIPTION OF THE DRAWINGS

The present invention will become more fully understood from the detailed description and the accompanying drawings, wherein:

FIG. 4 is an elevational view with some parts shown in section of the fastener of FIG. 1 depicting the fastener in its final set form in the minimum grip condition securing workpieces of a minimum total thickness;

FIG. 5 is an elevational view with some parts shown in section of the fastener of FIG. 1 depicting the fastener in its final set form in the maximum grip condition securing workpieces of a maximum total thickness;

DETAILED DESCRIPTION OF THE PREFERRED EMBODIMENTS

The following description of the preferred embodiments is merely exemplary in nature and is in no way intended to limit the invention, its application, or uses.

Figure 1:
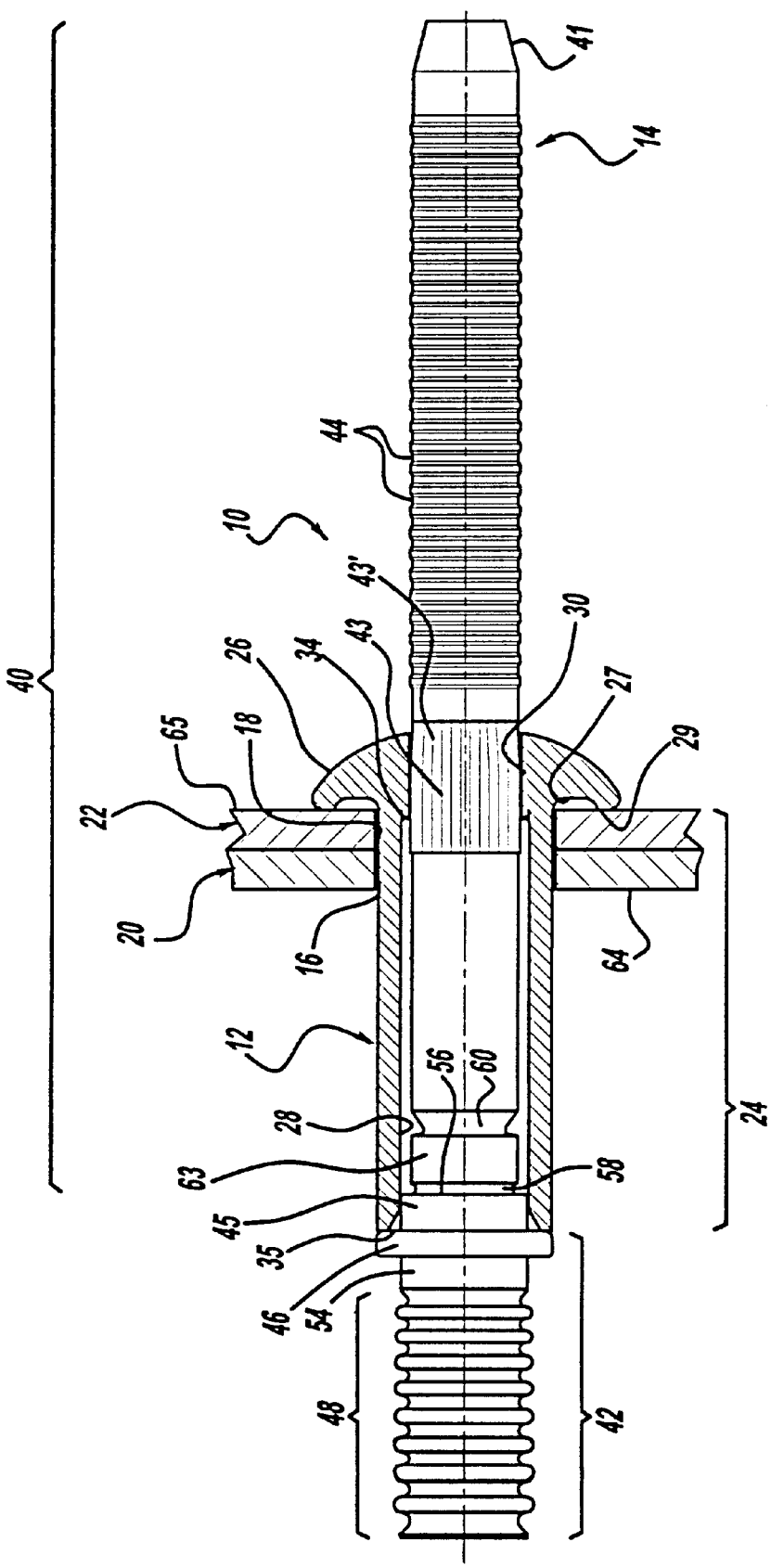
FIG. 1 is a side elevational view, with some parts shown in section, of a blind fastener, including a pin and a sleeve and embodying features of the present invention and shown preassembled and in relationship to a pair of workpieces of a minimum grip prior to installation.

Looking now to FIG. 1, a blind fastener 10 is shown and includes a hollow sleeve 12 and a pin 14 in a preassembled condition prior to installation. The fastener 10 is shown in a preinstalled condition and located in aligned openings 16 and 18, in inner and outer workpieces 20 and 22, respectively, which are to be joined together. Workpieces 20 and 22 have a combined thickness representing the minimum grip or minimum total workpiece thickness for the fastener 10. FIG. 4 shows the fastener 10 after installation and securing the workpiece 20 and 22 of minimum grip. FIG. 5 shows the fastener 10 in the installed condition with workpieces 20' and 22' having a combined thickness representing the maximum grip or maximum total workpiece thickness for the fastener 10.

Figure 3:
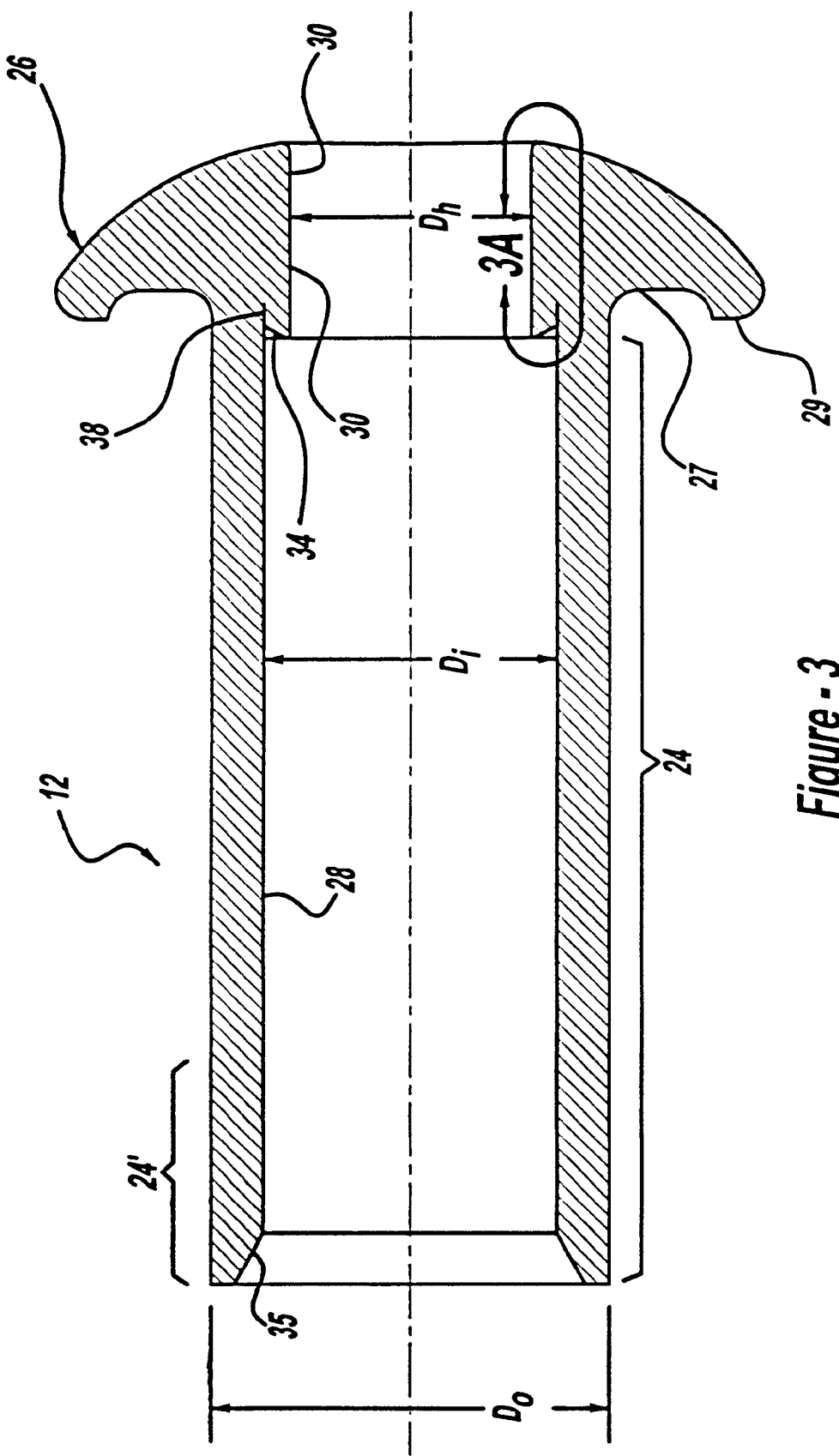
FIG. 3 is a side elevational sectional view of the sleeve of FIG. 1.

Looking now to FIGS. 1 and 3, the hollow sleeve 12 has a generally straight shank 24 of a uniform outside diameter Do which terminates at its forward end in an enlarged head 26. The enlarged head 26, which is of the protruding type, has a concave recess 27 adjacent the shank 24 to provide clearance with the outer edge of opening 18. A bearing ring portion 29 is formed at the circumferentially outer end of the recess 27 and has an engagement surface configuration, to be described, to maximize the resistance to slippage with the engaged surface of workpiece 22.

Sleeve 12 has a central through bore which includes a shank bore 28 of a diameter Di which extends substantially for the length of the shank 24 and communicates proximate the sleeve head 26 with a head bore 30 of a reduced diameter Dh. An annular sleeve stop shoulder 34 is defined at the juncture of shank bore 28 and the reduced diameter head bore 30. The shank bore 28 terminates at its opposite, outer end in a tapered, countersunk portion 35 which serves a purpose to be described. In this regard the angle of taper of the tapered portion 35 extends rearwardly through approximately one half the thickness of the sleeve shank 40.

Figure 3A:
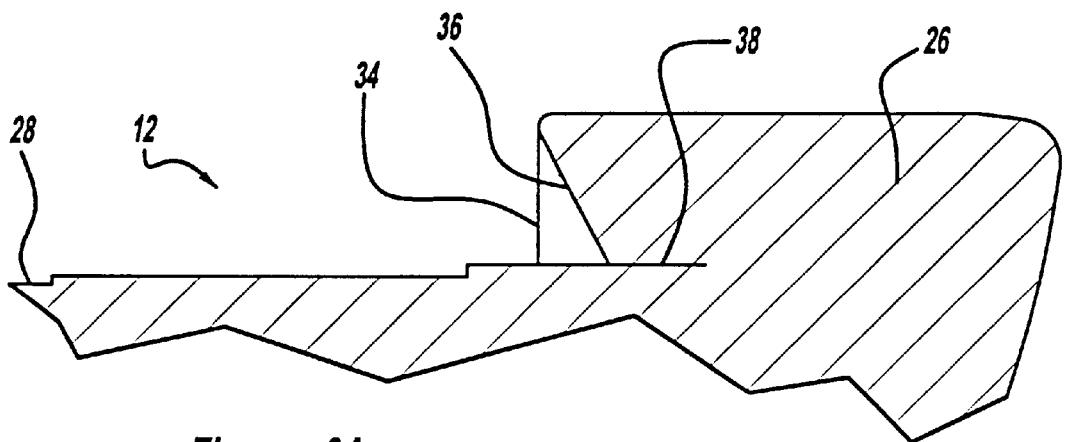
FIG. 3A is a fragmentary view to enlarged scale of the portion of the sleeve in the Circle 3A in FIG. 3.

An enlarged view of the stop shoulder 34 of the sleeve 12 is shown in FIG. 3A. Thus it can be seen that the stop shoulder 34 terminates in a radially inwardly rearwardly inclined generally frusto-conical surface 36 which is thus separated from the radially confronting portion of the sleeve 12. The sleeve stop shoulder 34 is further separated from the radially confronting portion of the sleeve 12 by an annular slit 38 which extends axially forwardly parallely with the reduced diameter bore 30.

It should be noted that the stop shoulder 34 on the sleeve 12 and a related stop shoulder on the pin 14, to be described, are substantially of a construction as taught in the '325 Patent to Smith previously cited. Therefore the subject matter of that patent is incorporated herein by reference.

Figure 2:
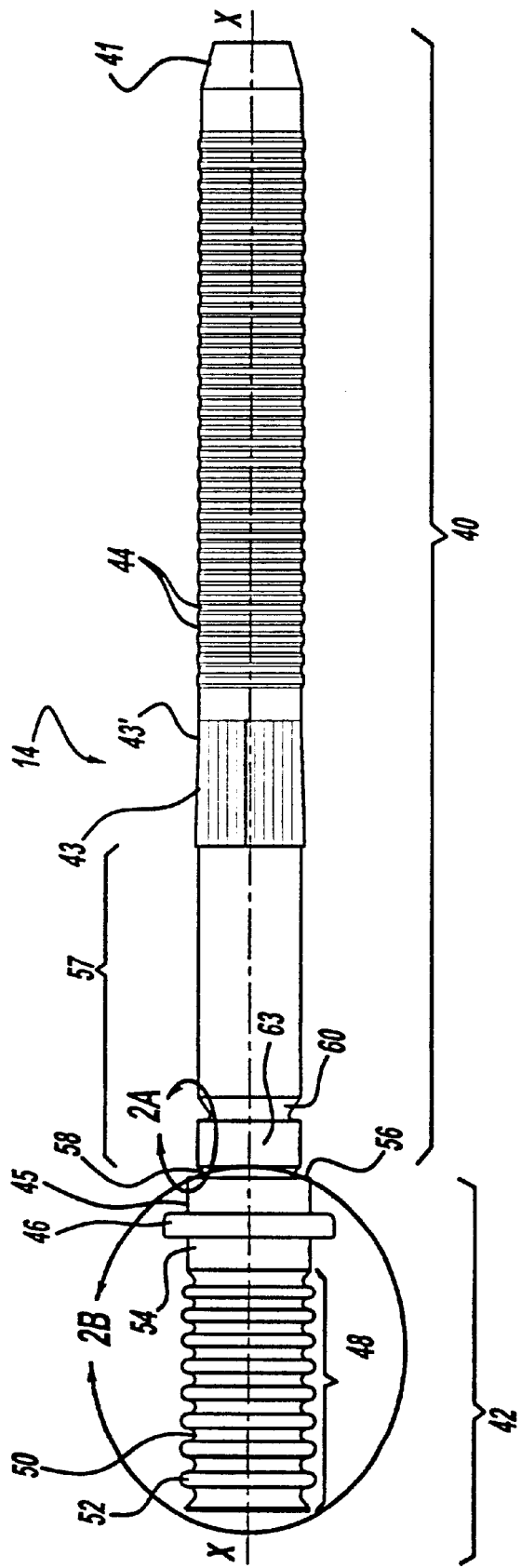
FIG. 2 is a side elevational view of the pin of FIG. 1.
Figure 2A:
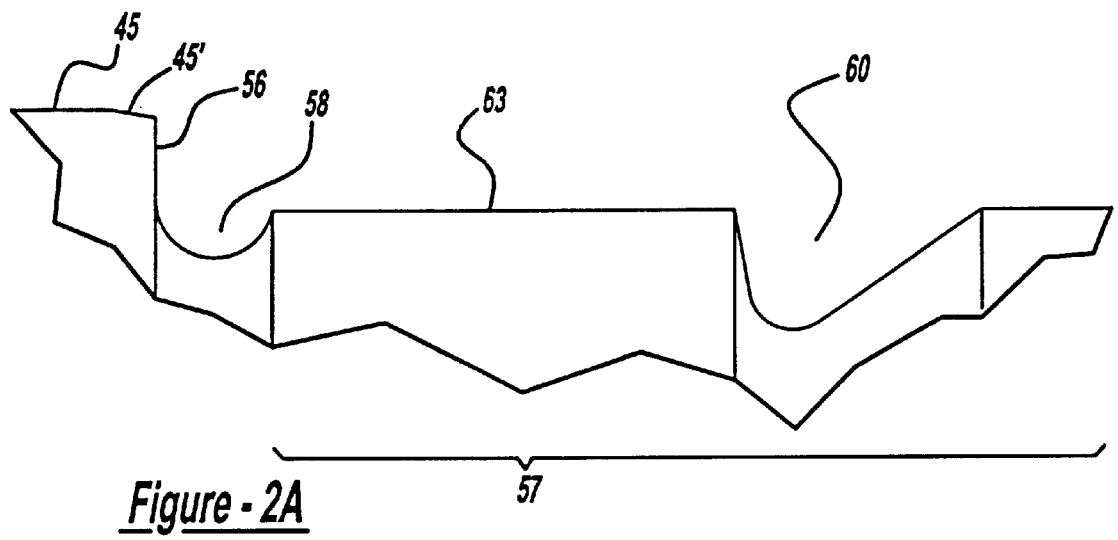
FIG. 2A is a fragmentary view to enlarged scale of the portion of the pin in the Circle 2A in FIG. 2.

Looking now to FIGS. 1 and 2, the pin 14 has an elongated pin shank 40 which terminates in a head segment 42 at its rearward end (the blind end of fastener 10). A plurality of annular pull grooves 44 are located at the opposite end of the pin shank 40. A knurled or splined connecting portion 43 is spaced rearwardly from the pull grooves 44 and is adapted to fit within the reduced diameter head bore 30 with a preselected interference to thereby hold the sleeve 12 and pin 14 together in a preassembled condition to facilitate handling prior to installation. The leading section 43' of the splined portion 43 is tapered to facilitate initial insertion of the splined portion 43 into the reduced diameter bore 30.

In this regard the diameter of the crests of the pull grooves 44 can be of a size to provide a clearance or slight interference with the reduced diameter Dh of head bore 30. Thus the outer end of the pin shank 40 is provided with a tapered section 41 to facilitate initial insertion of the pin shank 40 into the bore 30.

The pin head segment 42 has an annular guide portion 45 which is adapted to fit snugly within the outer end of the enlarged diameter sleeve shank bore 28. An enlarged diameter shear ring 46 is located immediately adjacent the guide portion 45 and is of a diameter Dsr which is within a range slightly less or slightly greater than the outside diameter Do of the sleeve shank 24. See FIG. 2B. A leading section 45' of the guide portion 45 is tapered to facilitate initial insertion of the guide portion 45 within the large diameter shank bore 28. Insertion is also facilitated by the tapered countersunk portion 35 at the outer end of sleeve shank bore 28. Now with the pin 14 preassembled to the sleeve 12, the splined connecting portion 43 in the reduced diameter bore 30 and the guide portion 45 in the enlarged diameter shank bore 28 provide the desired alignment of the shear ring 46 against the end of the collar shank 24 and the tapered countersunk portion 35 of the enlarged bore 28.

Figure 2B:
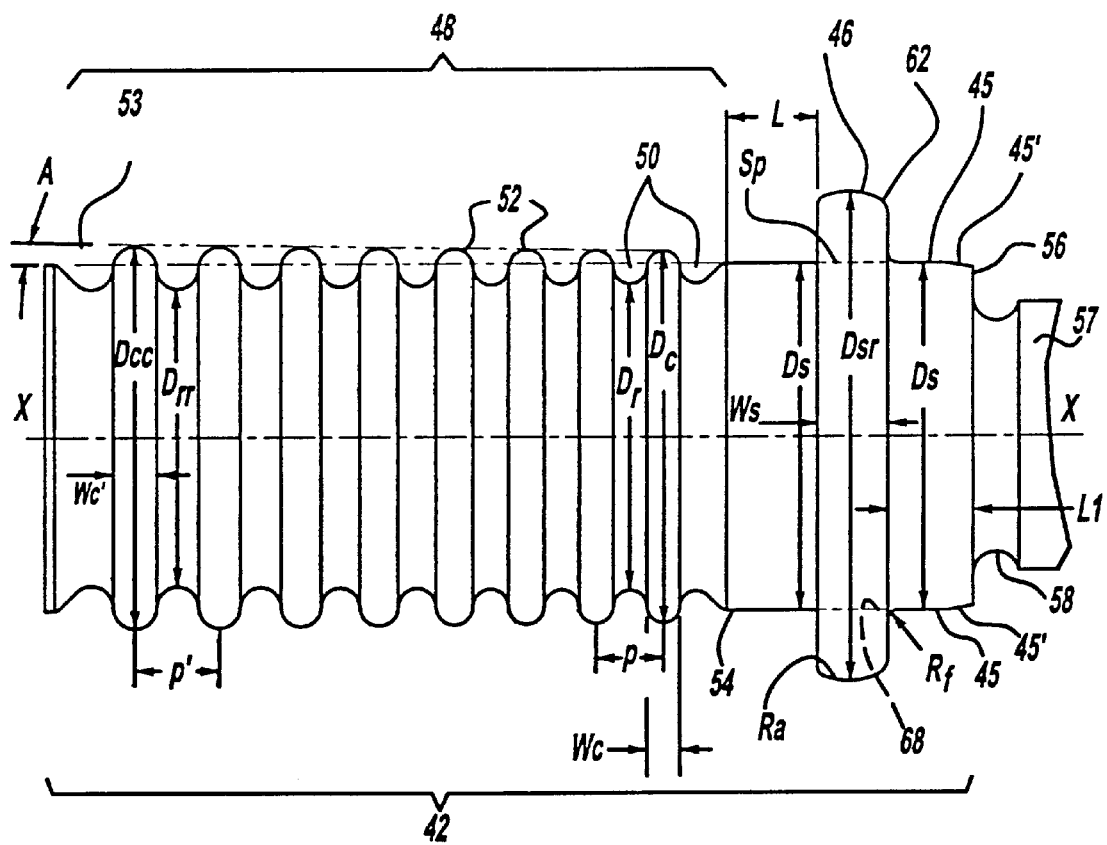
FIG. 2B is a fragmentary view to enlarged scale of the portion of the pin in the Circle 2B in FIG. 2.

Looking now to FIGS. 1, 2 and 2B, the pin head segment 42 includes an elongated reduced diameter gripping and retention portion 48 which extends rearwardly from the shear ring 46. The gripping and portion 48 includes a preselected number of retention grooves 50 which are separated by retention crests 52. The retention grooves 50 and crests 52 extend annularly.

The diameter of the crests 52 increase in a rearward direction from a diameter Dc to Dcc to define an outer surface line 53, extending at a preselected taper angle A. At the same time the depth of the retention grooves 50 increase in a rearward direction whereby the root diameters decrease from Dr to Drr. In addition the pitch of the grooves increase uniformly from a pitch P at the start to a pitch P' at the end. See FIG. 2B. At the same time the width of the crests 52 increase in a rearward direction from a width Wc to Wc'. The tapered structure of the retention portion 48 with varying crest diameters Dc, Dcc, root diameters Dr, Drr, crest widths Wc, Wc' and pitch P, P' results in part from roll formation on a relatively straight blank. However, it is believed that the increase in crest width Wc, Wc' assists in compensating for the increase in radial pivot length resulting from the decrease in root diameter Dr, Drr and increase in crest diameter Dc, Dcc. The increase in width Wc, Wc' also provides an increase in shear strength to resist shearing as the magnitude of applied force increases with the taper 53. In this regard the width Wc, Wc' is taken at the transition of the arcuate root 50 with the crest 52. See FIG. 2B.

The grooved retention portion 48 is connected to the shear ring 46 by a straight shank portion 54 which is of a diameter Ds which is less than the diameter Dc of the first crest 52. In addition the guide portion 45 is connected to the shear ring 46 with substantially the same diameter Ds. The straight shank portion 54 and guide portion 45 thereby define an annular shear plane Sp substantially of the diameter Ds through the shear ring 46. The shear ring 46 is of a width Ws which defines the length of the shear plane Sp. The guide portion 45 and leading section 45' are of larger diameters than the pin shank 40 with an overall length L1. Thus an annular pin stop shoulder 56 is defined by the juncture of the guide portion 45 and the pin shank 40. The stop shoulder 56 has an end surface which is generally planar and in a plane in quadrature with the longitudinal axis X of the pin 14 (see FIGS. 2 and 2B). A lock groove or pocket 58 is defined by an annular groove located immediately adjacent the pin stop shoulder 56. A generally smooth shank portion 57 extends between the guide portion 45 and the splined portion 43. The shank portion 57 includes an annular breakneck groove 60 which is located forwardly a preselected distance from the lock pocket 58 by a shank section 63. The preselected distance is selected to inhibit distortion of the lock groove 58 in response to the application of the relative axial force for installation of the fastener 10. The breakneck groove 60 defines the weakest section of the pin shank 40.

The fastener 10 is adapted to be set by an installation tool which can be of a type well known in the art and hence the details thereof have been omitted for simplicity. However, it should be noted that such a tool has a chuck jaw assembly which is adapted to grippingly engage the pull grooves 44 of the pin 14 while an anvil engages the enlarged sleeve head 26 which is in engagement with the outer or accessible surface 65 of the workpiece 22. Upon actuation of the tool, the jaw assembly moves axially, outwardly away from the anvil whereby a relative axial force is applied between the pin 14 and sleeve 12 to move the pin 14 into the sleeve 12.

When the relative axial force increases to a predetermined magnitude the shear ring 46 will be pulled into the large diameter shank bore 28 at the outer end of the sleeve shank 24. This causes the sleeve shank 24 in that area to expand radially outwardly to form an enlarged tulip shaped blind head 61. As will be seen the blind head 61 when finally formed has a unique clamp support and lock section 66 at the inner or blind side workpiece surface 64. In this regard, it should be noted that the fastener 10 can be used to secure workpieces where both sides are accessible.

The radially outer circumferential surface 62 of the shear ring 46 is arcuately formed with a radius Ra which along with the tapered, countersunk portion 35 at the end of the shank bore 28 facilitates initial movement of the shear ring 46 into the bore 28. The shear ring 46 in moving into the shank bore 28 will shear some of the material from the outer end of the bore 28 to form a support ring 67. In this regard the radius Ra provides a relatively slight arcuate outer surface 62 on the shear ring 46 whereby the shearing action is not inhibited. The movement of the pin 14 and shear ring 46 continues until the shear ring 46 with the support ring 67 is located in the shank bore 28 at a position proximate to the rear or blind side surface 64 of the workpiece 20. The relative axial force applied to the pin 14 and sleeve 12 clamps the workpieces 20 and 22 together at a preselected magnitude of clamp load. At the same time, the support ring 67 engages the inner surface of the sleeve shank bore 28 at the clamp and lock section 66 which is in engagement with the inner or blind side surface 64 and the adjacent area of the through bore 16. At this point the tulip shaped blind head 61 is fully formed and further movement of the shear ring 46 is substantially blocked.

As the magnitude of relative axial force increases it reaches a preselected magnitude at which the shear ring 46 is sheared from the guide portion 45 and straight shank portion 54 substantially across the shear plane Sp to define a central opening or bore 68. It should be noted that the shear ring 46 is connected to the guide portion 45 by relatively small fillet radius Rf. Thus the fracture will be initiated at that juncture slightly above the shear plane Sp. The radius Rf is provided to preclude excessive stress concentrations which could possibly result in premature facture. Now the smooth shank portion 54 is moved through the shear ring 46 at which point the retention portion 48 will begin to be moved into the sheared opening 68 of the shear ring 46. As this occurs the first groove 50, which is of a smaller diameter than the shear plane Sp and hence of the opening 68 in the shear ring 46, will be moved into the shear ring 46. Now the first crest 52, which is of a diameter larger than the shear plane Sp and hence of the opening 68 in the shear ring 46, will be brought into engagement with the radially inner surface of the opening 68 of the shear ring 46. This movement of the retention portion 48 will continue until the pin stop shoulder 56 engages the sleeve stop shoulder 34. At this point the material of the sleeve stop shoulder 34 will be moved by the pin stop shoulder 56 into the lock pocket groove 58 after which further movement of the pin 14 relative to the sleeve 12 will be stopped. Now the magnitude of the relative axial force will increase to a magnitude at which the pin shank 40 will be severed at the breakneck groove 60 and the installation completed.

During the movement of the retention portion 48 additional ones of the retention grooves 50 and retention crests 52 will be operatively engaged with the shear ring 46. FIGS. 4 and 5 show the fastener 10 in the final installed condition with FIG. 4 showing the fastener 10 in the minimum grip or workpiece thickness condition and FIG. 5 showing the fastener 10 in the maximum grip or workpiece thickness condition. Thus from FIGS. 4 and 5 it can be seen that the number of grooves 50 and crests 52 operatively engaged with the shear ring 46 will vary depending upon the overall thickness or grip of the workpieces. In this regard the overall grip range of the fastener 10 can be selectively varied by providing more or less retention grooves 50 and crests 52.

Thus in the minimum grip condition shown in FIG. 4, essentially two of the retention crests 52 and one retention groove 50 will be operatively engaged with the shear ring 46. FIG. 5 shows the fastener 10 in the installed condition with workpieces 20' and 22' being of the maximum total thickness for the maximum grip condition of the fastener 10 and with essentially all of the retention crests 52 and retention grooves 50 having been engaged with the shear ring 46. As the crests 52 are moved through the shear ring 46, they are essentially deformed or folded into the adjacent trailing one of the retention grooves 50. At the same time, however, there will always be at least one retention crest 52 remaining on the outer side of the opening 68 of the shear ring 46 to provide retention of the shear ring 46 within the blind head 61 to increase the strength of the blind head 61 with the clamp and lock section 66 against the rear or blind side surface 64 of workpiece 20. In this regard, there could be a slight radial expansion of the opening 68 of the shear ring 46 as it overengages the retention crests 52. The tapered structure with the increasing diameters of successive ones of the retention crests 52 compensates for any such expansion to thereby provide an additional lock between the pin 14 and sleeve 12 to enhance the resistance of the pin 14 to push out from the sleeve 12. At the same time the folded one of the crest 52 which is within the shear ring opening 68 will tend to resiliently spring back to engage it to provide additional retention force.

In addition the close, tight engagement between the shear ring 46 and support ring 67 with the inner surface of the shank bore 28 provides additional significant resistance to pin push out while supporting clamp retention. In this regard it should be noted that as the shear ring 46 moves into the shank bore 28 to radially expand the sleeve shank 24, the expanded portion of the sleeve shank 24 will resiliently spring back to return partially radially inwardly to grip the shear ring 46 to enhance the strength of the clamp and lock section 66.

It can also be seen in FIGS. 4 and 5 that the shear ring 46 and the support ring 67 will be effective in engagement with the shank bore 28 near the inner or blind side surfaces 64 and 64' to radially expand the sleeve shank 24 radially outwardly to fill the clearance at that area between the sleeve shank 24 and the bores 16 and 16' to further increase the strength of the fastener 10. In this regard, the material of the support ring 67 will be compressed to partially flow into and fill the area between the pin and sleeve bore 28 to expand the sleeve shank 24 in that area into engagement with the workpiece bore 16. Although this expansion is limited it does further enhance the strength of the clamp support and lock section 66 of the blind head 61.

In the movement of the pin shank 40 relative to the sleeve 12, the pin shank section 63 is moved into the reduced diameter head bore 30 and acts as a guide for the pin 14 to assist alignment of pin stop shoulder 56 with sleeve stop shoulder 34. Note that the breakneck groove 60 and pin stop shoulder 56 are separated by a preselected distance such that when the pin stop shoulder 56 is held from further axial movement by the sleeve stop shoulder 34, the breakneck groove 60 will be located substantially within the bore 30 in the sleeve head 26 such that upon fracture of the breakneck groove 60 the outer end of the pin 14 at the fracture groove 60 will generally not extend beyond the adjacent outer surface of the sleeve head 26.

As noted the sleeve stop shoulder surface 36 is inclined to assist the material thereof to be folded or moved radially inwardly into the lock groove 58. In this regard the engaging surface of pin stop shoulder 56 is oriented relative to that of the tapered sleeve shoulder surface 36 such as to assist in the radially inwardly folding action; thus the material of sleeve stop shoulder 34 will be substantially directed radially inwardly and not radially outwardly. As previously noted, the sleeve stop shoulder 34 can be annularly separated for an additional selected distance along the annular slit 38. This slit or separation 38 enhances the radially inward folding action of the material of the sleeve stop shoulder 34 into the lock groove 58. Of course, the tapered sleeve surface 36 defines the initial radial separation of the sleeve stop shoulder 34 from the radial confronting portion of the sleeve 12.

The volume of the material of the sleeve stop shoulder 34 is selected relative to the volume of the lock groove 58 such that the lock groove 58 will be substantially filled and axial movement of the pin 14 will be stopped at the desired location generally when that filled condition occurs, i.e. such that pin break at breakneck groove 60 occurs within the sleeve head 26. Thus the volume of sleeve stop shoulder 34 which is separated from the remainder of the sleeve 12 by the tapered portion and slit 38 is generally equal to or greater than the volume necessary to fill the lock groove 58 and adjacent area between the pin 14 and sleeve 12. At the same time, the axial length of slit 38, when utilized, is limited to inhibit axial shearing of the sleeve stop shoulder 34 and/or the impairment of the pin stopping function.

The sleeve stop shoulder 34 as separated from the remainder of the sleeve 12 by the taper and slit 38 is generally located within the confines of the enlarged sleeve head 26. The sleeve head 26 provides radial stiffness and resists any tendency for radial expansion of sleeve 12 as the stop shoulder 34 is deformed into the lock groove 58. Thus by locating the sleeve stop shoulder 34 substantially within the confines of the sleeve head 26, such radial expansion is inhibited. The radial confinement of the sleeve 12 by the workpiece bores 16, 16' and 18, 18' is not essential. In fact, the fastener 10 could be satisfactorily installed with an adequate lock where there is a substantial radial clearance between bores 16, 16' and 18, 18' and sleeve shank 24. In this regard an element of the unique structure of the fastener 10, to be described, provides a desired magnitude of bearing stress with the engaged workpiece surfaces 65, 65' to substantially inhibit slippage in such clearance applications. It should be noted, however, that different stop and lock structures could be used between the sleeve 12 and pin 14.

It can be seen from FIGS. 4 and 5 that the clamp and lock section 66 is of substantially the same final form for providing a uniform high strength blind head over an extended grip range for the fastener 10.

It can be seen, that the clamp and lock section 66 with the shear ring 46 is literally at the inner or blind side surface 64, 64'. For the minimum grip condition of FIG. 4, this results in the axial distance from the clamp and lock section 66 to the sleeve stop shoulder 34 being somewhat minimized. Thus in order to provide the fastener 10 with the capability of use over a wide grip range including a minimized, minimum grip or minimum total workpiece thickness, the axial length L of the straight shank portion 54 is minimized. In one form the axial length L was made slightly greater than the width Ws of the shear ring 46 to facilitate shear. With this structure, the shear ring 46 is brought into contact with the first crest 52 with minimal movement of the pin shank 40 after shearing.

In one form of the invention the pin 14 and sleeve 12 were made of ferrous materials with the pin 14 being made of a 1038 steel having a hardness of around Rockwell C 40–42 and the sleeve 12 being made of a 1006 steel having a hardness of around Rockwell B 90–95. In this regard the outer end section 24' of the sleeve shank 24 at which formation of the tulip shaped blind head 61 is initiated is generally annealed to a gradient of reduced hardness of from around Rockwell B 60 at the outer surface of section 24' to the full hardness at the inner end of the section 24'. This facilitates the initial movement of the shear ring 46 into the enlarged shank bore 28 and the radial expansion of the shank 24 to form the tulip type blind head 61 and to preclude bulbing from column loading and/or splitting of the outer end of the shank 24. This also facilitates shearing of the surface of the shank bore 28 to form the support ring 67 with the support ring 67 being somewhat pliable. At the same time, the annealed material of the support ring 67 provides a relatively pliable structure which facilitates compliance with the engaged surface of the shank bore 28 and flow into the area between the pin and sleeve bore 28 as noted. In this regard then the gradient of annealing is limited and only over the outer, end section 24' whereby the portion of the sleeve shank 24 in the clamp and lock section 66 of the enlarged tulip blind head 61 in engagement with the workpiece surface 64 is substantially at full strength. This further enhances the strength of clamp and lock section 66.

As noted, the enlarged sleeve head 26 has a bearing ring portion 29 at its outer circumferential end which is in engagement with the outer workpiece surface 65 while the recess 27 provides clearance with the outer edge of the workpiece opening 18. Such sleeve head constructions are generally known in the fastener field; however, it is believed that the unique construction of the sleeve head 26 provides improved bearing between the ring portion 29 and the outer workpiece surface 65 to resist slippage. In this regard the engaging surface of the bearing ring portion 29 is substantially planar and in quadrature with the longitudinal axis X of the sleeve 12 to provide a substantially uniform surface engagement with the workpiece surface 65. At the same time the width of the bearing ring portion 29 has been limited to provide a relatively high concentration of load distribution substantially without distortion of the ring portion 29 and of the workpiece surface 65, 65'. In this regard, the recess 27 is joined to the ring portion 29 with a generally transverse contour inhibiting any substantial increase in the area of the engaging surface of the ring portion 29 in response to the clamp force applied to the workpieces 20 and 22.

It is believed that a bearing stress applied by the ring portion 29 against the engaged surface 65 of a magnitude near the tensile strength of the material of the workpiece 22 will provide a desired high magnitude of bearing stress. Such a high magnitude of bearing stress will substantially optimize the slip resistance between the workpiece 22 and sleeve head 26. In this regard it has been found that a bearing surface area of the bearing ring portion 29 providing a bearing stress at installation of at least around 40% to 50% of the tensile strength of the material of the workpiece 22, 22' provided the desired amount of bearing area. This then results in a relatively high bearing stress with a resultant increase in frictional force to resist slippage of the outer workpiece 22, 22' relative to the fastener 10. This is especially significant since there is essentially no hole fill between the bore 18, 18' of workpiece 22, 22' and the sleeve shank 24. Workpieces 22, 22' which the fastener 10 secures are typically made of materials such as the following: (1) ASTM A36 steel having a tensile strength of 58,000 psi and yield strength of 36,000 psi and 6061-T6 aluminum having a tensile strength of 45,000 psi and yield strength of 40,000 psi. A comparison of the improved sleeve head 26 and a typical protruding type sleeve head is shown in FIG. 4B and will be discussed.

Typically the pin 14 and sleeve 12 are plated with a zinc or other suitable material to provide corrosion resistance. The plating also serves as a lubricant and reduces friction between the pin 14 and sleeve 12 during installation thereby assisting consistent performance. Frictional affects can be further reduced by the use of a light coat of a lubricant such as Castrol Safety Film 616 made by Castrol. Such lubricant coatings are provided mainly for reduction in friction at the outer surface of the sleeve shank 24 and the bores 28 and 30 through the sleeve. At the same time because of the magnitude of bearing stress applied by the bearing ring portion 29 slip resistance will be substantially unaffected.

It should also be noted that the lock mechanism of fastener 10 is performed by the interaction of pin 14 and sleeve 12 and is not dependent upon any special construction of the installation tool.

In this regard it should be understood that the unique construction of the fastener 10 for forming the enlarged tulip shaped blind head 61 with high strength clamp and lock section 66 can be used with other forms of mechanical locks at the other end. For example it can be used with a different form of internal lock such as is shown in the U.S. Pat. No. 4,627,775 issued Jul. 4, 1989 to Richard Dixon for Blind Fastener With Grip Compensating Means. It can also be used with a three piece type blind fastener with an external lock ring as shown in U.S. Pat. No. 4,844,673 issued Jul. 4, 1989 to James W. Kendall. In addition, it is believed that it can also be used with blind fasteners having a swage type external lock such as shown in U.S. Pat. No. 5,178,502 issued Jan. 12, 1993 to Shahriar M. Sadri.

One form of the fastener 10 has a sleeve 12 and pin 14 with the construction as noted and having design elements generally in accordance with the following charts:

| SLEEVE 12 | | |
|---|---|---|
| Material<br>1006 Steel | Hardness<br>Rockwell B90–95 | Annealed<br>Section 24'<br>Rockwell B60 Min. |
| Sleeve Shank 24 | Outside Diameter Do .253"<br>Angle Of Taper 35 25°–35° | Bore 28 Dia. Di .1855"–.1870"<br>Length of Taper 35 .030"–.035" |
| Sleeve Head 26 | Outside Diameter Dh .450"<br>Width Rw Of Bearing Ring Portion 29 .014" | Length of Taper .030"–.035"<br>Area Of Bearing Ring Portion 29 .017 in² |
| | Bearing Stress Of Bearing Ring Portion 29 of 30,000 psi at clamp force of 500 lbs.<br>Diameter, Reduced Diameter Bore Dh 30 .1580"–.1595".<br>Height H Of Head 26 .112" | |

| PIN 14 | | |
|---|---|---|
| Material | 1038 Steel Rockwell C40–42 | |
| Pull Grooves 44 | Crest Dia. .160" max. | Root Dia, .150" min. |
| Splined Portion 43 | O.D. of Straight Section .1630"–.1650" | Leading Portion 43' Taper to .155" |
| Pin Head Segment 42 | Guide Portion 45 Dia. Ds, .1855", Length L1 .053" | Shank Portion 54 Dia. Ds. 1855", Length L .050" |
| | Shear Ring 46 | |
| | Diameter Dsr .256" | Width Ws .033" |
| | Radius Outer Surface 62-Ra .037" | |
| | Fillet Radius Rf-.0005" | |
| | Shear Plane Sp-Dia.Ds .1855" | |

-continued

Retention Groove Portion 48
Length .360"
8 Crests 52 Dia. Dc-Dcc .197"–.204"
8 Grooves 50 Dia. Dr-Drr .1625"–.1565"
Taper Angle A of Crests 52. Along
Line 53 1/2°
Pitch of Crests 52 P .035" to P' .045"
Width of Crests 52 Wc .017" to Wc' .023"

Figures 6, 7:
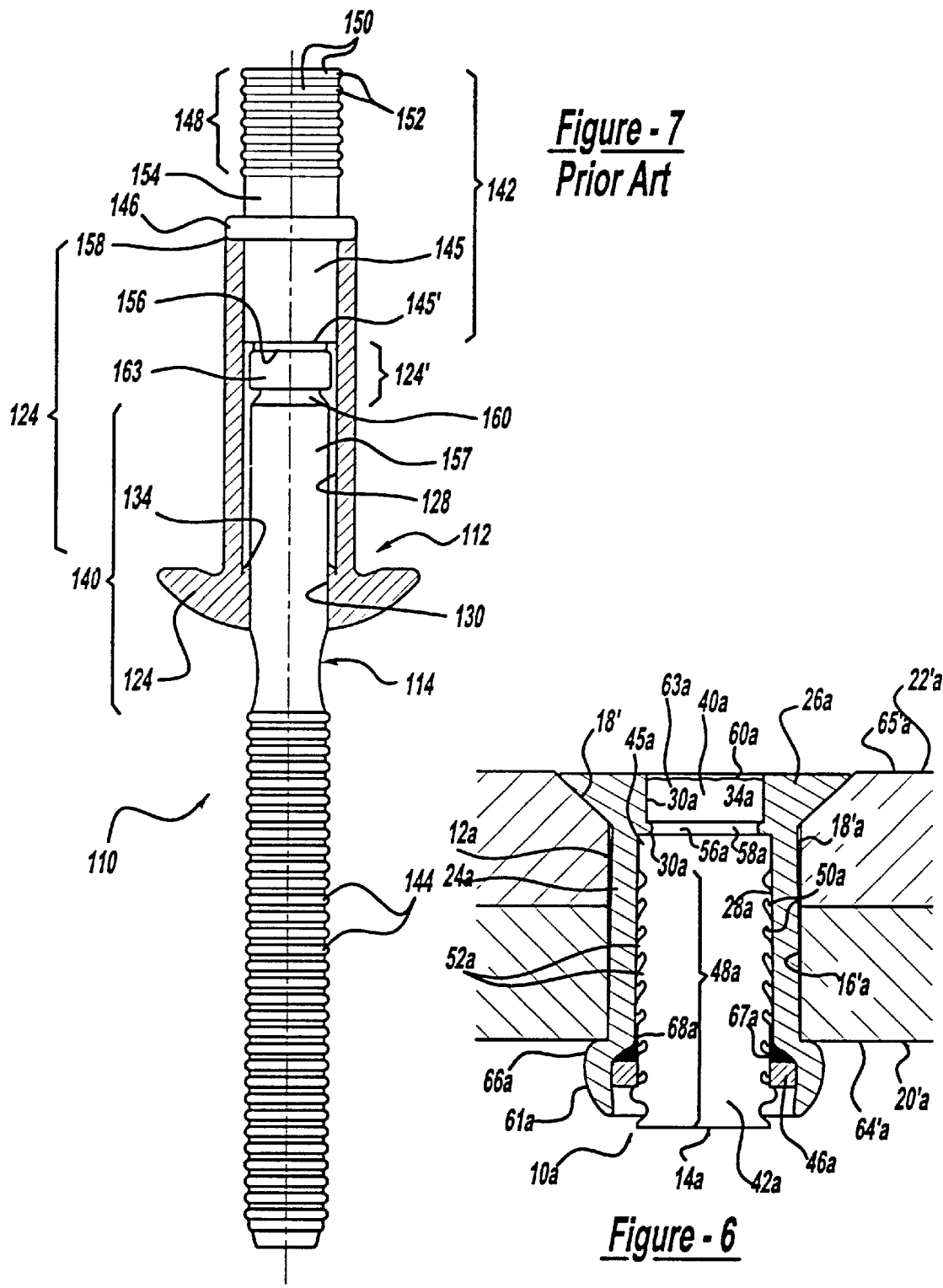
FIG. 6 is a side elevational view similar to FIG. 5 depicting a fastener with a flush head type sleeve in its final set form in the maximum grip condition.
FIG. 7 is a side elevational view, with some parts shown in section, of a prior art MAGNA-BULB type blind fastener, including a pin and a sleeve preassembled and prior to installation.
Figure 8:
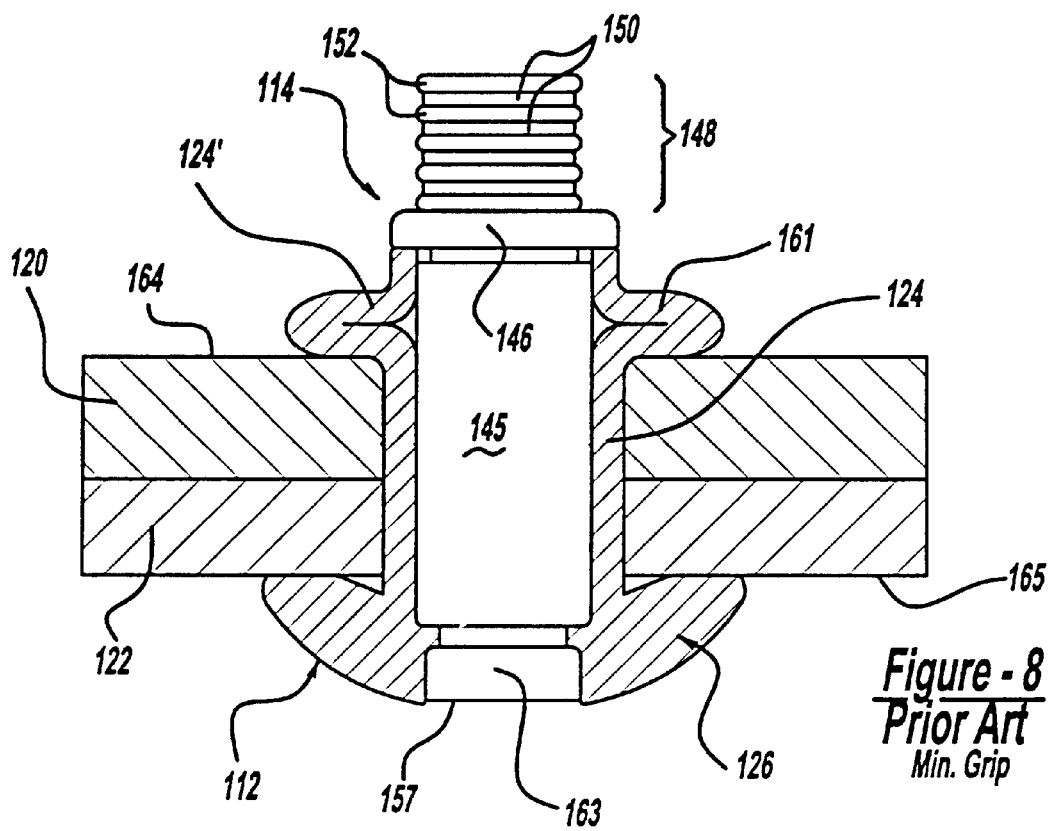
FIG. 8 is an elevational view with some parts shown in section of the prior art MAGNA-BULB type fastener of FIG. 7 depicting the fastener in its final set form in the minimum grip condition securing workpieces minimum total thickness.
Figure 9:
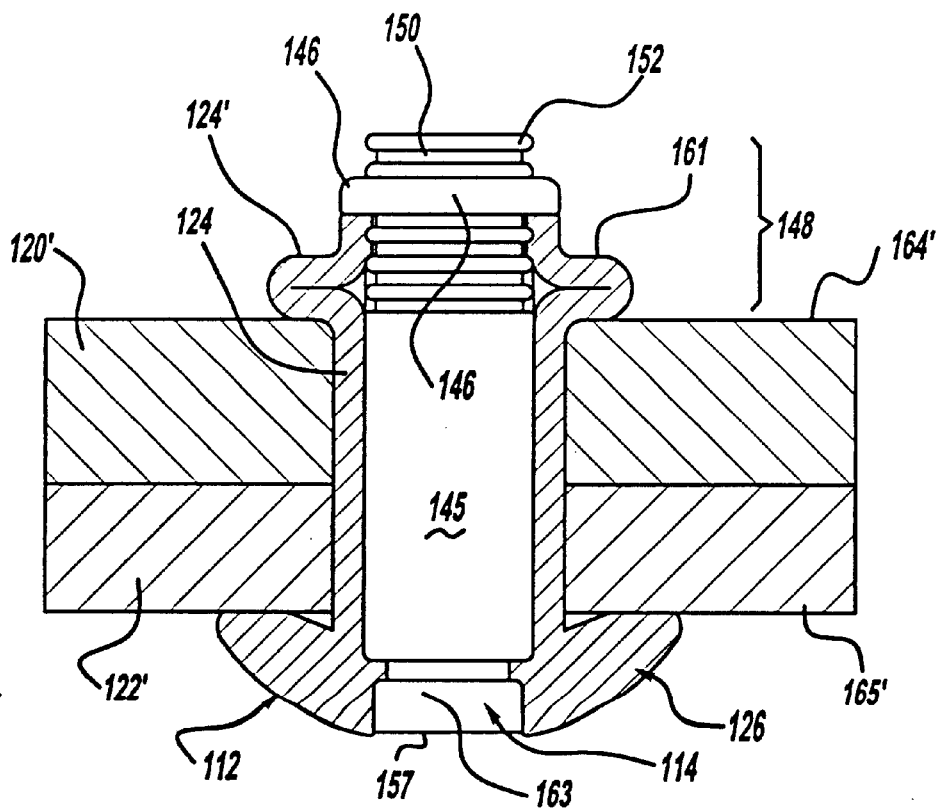
FIG. 9 is an elevational view with some parts shown in section of the prior art MAGNA-BULB type fastener of FIG. 7 depicting the fastener in its final set form in the maximum grip condition securing workpieces of a maximum total thickness.

The differences between the fastener of the present invention and the MAGNA-BULB type fastener can be readily seen in reviewing the drawings of the MAGNA-BULB fastener in FIGS. 7–9. In FIG. 7 the MAGNA-BULB blind fastener 110 is shown and includes a hollow sleeve 112 and a pin 114 in a preassembled condition prior to installation. FIG. 8 shows the fastener 110 after installation and securing workpiece 120 and 122 of minimum grip. FIG. 9 shows the fastener 110 in the installed condition with workpieces 120' and 122' having a combined thickness for the maximum grip.

The hollow sleeve 112 has a generally straight shank 124 of a uniform outside diameter which terminates at its forward end in an enlarged protruding type head 126.

Sleeve 112 has a central through bore which includes a shank bore 128 which extends generally for the length of the sleeve shank 124 and communicates proximate the enlarged head 126 with a reduced diameter head bore 130. An annular stop shoulder 134, similar to stop shoulder 34, is defined at the juncture of shank bore 128 and the reduced diameter bore 130. The bore 128 of sleeve 112 terminates at its opposite, outer end in a flat surface of generally full wall thickness for purpose to be described.

The pin 114 has an elongated pin shank 140 which terminates in a head segment 142 at its rearward end (the blind end of fastener 110); pin 114 has a plurality of annular pull grooves 144 at the opposite end of the pin shank 140.

The pin head segment 142 has a guide portion 145 which is adapted to fit snugly within the outer end of the enlarged diameter sleeve shank bore 128. An enlarged diameter shear ring 146 is located immediately adjacent the guide portion 145 and is of a diameter which is slightly less or slightly greater than the outside diameter of the sleeve shank 124. A leading section 145' of the guide portion 145 is tapered to facilitate initial insertion of the guide portion 145 within the large diameter bore 128.

The pin head segment 142 includes an elongated reduced diameter grooved retention portion 148 which extends rearwardly from the shear ring 146. The grooved portion 148 includes a preselected number of retention grooves 150 which are separated by retention crests 152. The retention grooves 150 and crests 152 extend annularly. However, unlike the varying diameters of the crests 52 forming the tapered surface line 53 and varying diameters of the grooves 50 the diameter of the crests 152 and grooves 150 are generally uniform. In addition, the grooves 150 are at a constant pitch P1 and the grooves 150 and crests 152 are substantially of uniform contour.

The grooved portion 148 is connected to the shear ring 146 by a straight shank portion 154 which is of a diameter less than the diameter of the crests 152. In addition the guide portion 145 is connected to the shear ring 146 with substantially the same diameter. The straight shank portion 154 and guide portion 145 thereby define an annular shear plane through the shear ring 146. The guide portion 145 and leading section 145' are of larger diameters than the pin shank 140. An annular pin stop shoulder 156 is defined by the juncture of the reduced diameter guide portion 145 and the pin shank 140. The stop shoulder 156 is generally planar and in a plane in quadrature with the longitudinal axis of the pin 114. A lock groove or pocket 158 is defined by an annular groove located immediately adjacent the pin stop shoulder 156. A generally smooth shank portion 157 extends from the guide portion 145. The shank portion 157 includes an annular breakneck groove 160 which is located forwardly a preselected distance from the lock pocket 158 by a shank section 163.

The fastener 110 is also adapted to be set by an installation tool which can be of a type well known in the art. Upon actuation of the tool, a relative axial force is applied between the pin 114 and sleeve 112 to apply a column load on the sleeve shank 124. When the relative axial force increases to a predetermined magnitude the shear ring 146 will cause the sleeve shank 124 to fold or expand radially outwardly adjacent the blind side workpiece surface 164 to form an enlarged bulbed shaped blind head 161. In this regard, the sleeve shank 124 is band annealed over a shank section 124' to substantially weaken the area adjacent the blind side workpiece surface 164, 164' to facilitate bulbing in response to the column load. This movement continues until the bulbed blind head 161 is completed with the shear ring 146 at the outer end of the sleeve shank 24.

As the magnitude of relative axial force increases it reaches a preselected magnitude at which the shear ring 146 is sheared from the guide portion 145 and straight shank portion 154. Now the straight shank portion 154 is moved through the shear ring 146 at which point the retention portion 148 will begin to be moved into the opening of the shear ring 146 with the shear ring 146 remaining at the outer end of the sleeve shank 124. This movement of the retention portion 148 will continue until the pin stop shoulder 156 engages the sleeve stop shoulder 134. As this occurs the material of the sleeve stop shoulder 134 will be moved by the pin stop shoulder 156 into the lock pocket groove 158 after which further movement of the pin 114 relative to the sleeve 112 will be stopped. At this point the magnitude of the relative axial force will increase to a magnitude at which the pin shank 140 will be severed at the breakneck groove 160 and the installation completed. During the movement of the retention portion 148 additional retention grooves 150 and retention crests 152 will be engaged with the shear ring 146. FIGS. 8 and 9 show the fastener 110 in the final installed condition with FIG. 8 showing the fastener 110 in the minimum grip or workpiece thickness condition and FIG. 9 showing the fastener 110 in the maximum grip or workpiece thickness condition. It can also be seen that the bulb type blind head 161 is somewhat larger in the minimum grip condition of FIG. 8 than in the maximum grip condition of FIG. 9 and thus Is not of uniform configuration over the grip range.

It can be readily seen then that the fastener 10 of the present invention is substantially and uniquely different from the MAGNA-BULB type fastener 110 both in construction and performance. In this regard, as noted, the blind head defined by the clamp and lock section 66 is of a substantially uniform construction and strength over the grip range of the fastener 10. This also assists the installed fastener 10 to have high shear and tensile strength and high resistance to push out of the pin 14.

Figure 3B:
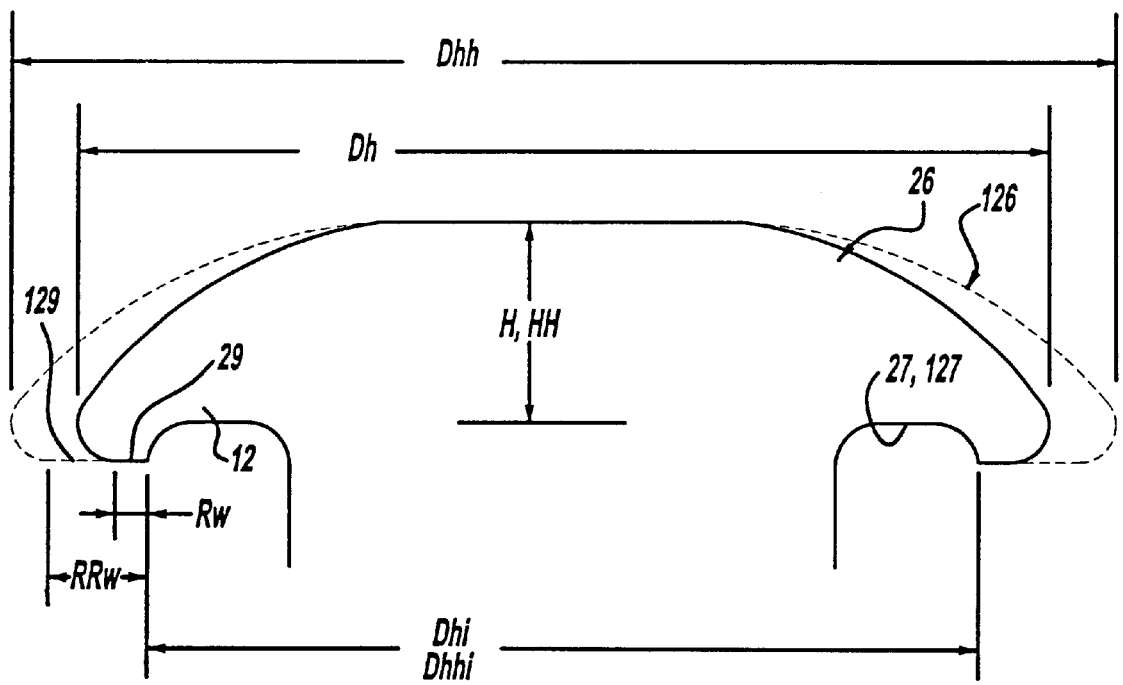
FIG. 3B is a fragmentary sectional view to enlarged scale of the construction of the sleeve head in the Circle 3B in FIG. 3 shown in comparison to a sleeve head of conventional construction with the conventional construction shown in phantom and with section lines omitted for purposes of clarity.

As previously noted the protruding sleeve head 26 of the sleeve 12 of the present invention is of a different construction than the conventional protruding head such as the protruding head 126. A comparison of the two forms of blind heads for the same sized fasteners is shown in FIG. 3B. In FIG. 3B the sleeve head 26 is shown in solid lines while sleeve head 126 is shown in phantom and while the views are in a sense sectional, section lines have been omitted for simplicity and clarity. Thus it can be seen that the outside diameter Dh of the sleeve head 26 is considerably less than the outside diameter Dhh of sleeve head 126. The inside diameter Dhi of the sleeve head 26 of the radially inner end of the bearing ring portion 29 is the same as the inside diameter Dhhi of the sleeve head 126. Thus the concave recess 27 is generally of the same radial width and hence size as the concave recess 127. However, the bearing ring portion 29 is substantially smaller than the bearing ring portion 129. In fact in one form, the radial width Rw of the bearing ring portion 29 was approximately 40% of the radial width RRw of the bearing ring portion 129. Now assuming that the final clamp load of the workpieces 20, 20' and 22, 22' and 120, 120' with 122, 122' is the same, it can be seen that the bearing surface stress of the bearing ring portion 29 relative to the outside surface 65, 65' is substantially greater than that of the bearing ring portion 129 relative to surface 165, 165'. This then provides a substantially greater resistance to slippage between the sleeve head 26 and surface 65, 65' than between the sleeve head 126 and surface 165, 165'. The area of the bearing ring portion 29 while substantially reduced is still selected to provide ample strength to resist tensile load and to resist localized distortion of the workpiece surface 65, 65' and/or of the sleeve head 26.

In addition to the above, the reduction in the overall size of the sleeve head 26 results in a fastener 10 of lighter weight and reduced cost. In this regard the axial height H of sleeve head 26 is the same as the axial height HH of sleeve head 126. However, the overall area and hence volume of the sleeve head 26 is considerably less than that of sleeve head 126.

The following is a chart of typical comparative dimensions of the sleeve heads 26 and 126 for the same sized fasteners.

| SLEEVE HEAD 26 | SLEEVE HEAD 126 |
| --- | --- |
| Outside Diameter Dh .450" | Outside Diameter Dhh .512" |
| Bearing Ring Portion 29 | Bearing Ring Portion 129 |
| Radial Width Rw .030" | Radial Width Rww .075" |
| Inside Diameter Dhi .385" | Inside Diameter Dhhi .385" |
| Axial Height H .112" | Axial Height HH .112" |

It should be understood, however, that features of the fastener 10 could be used with a sleeve such as sleeve 12 but with a protruding head such as sleeve head 126.

It was previously noted that the unique features of the present invention could be utilized with sleeves having a flush head construction.

Such a fastener with a flush type sleeve head is shown as installed in a maximum grip condition in FIG. 6. In the description of the embodiment of FIG. 6 components similar to like components of the fastener 10 are given the same numerical designations with the addition of the subscript letter "a". Thus the elements that are essentially the same will only be generally discussed and can be considered to have the same features unless described otherwise.

Looking now to FIG. 6, a blind fastener 10a is shown and includes a hollow sleeve 12a and a pin 14a and located in aligned openings 16'a and 18'a, in workpieces 20'a and 22'a, which have a combined thickness representing the maximum grip or maximum total workpiece thickness for the fastener 10a.

The hollow sleeve 12a has a generally straight shank 24a of a uniform outside diameter which terminates at its forward end in an enlarged head 26a. The enlarged head 26a, is of the flush or countersunk type. As such the head 26a is located in a tapered, countersunk bore portion 18'aa in the outer workpiece 22'a.

The sleeve 12a has a central through bore which includes a shank bore 28a which extends substantially for the length of the shank 24a and communicates proximate the enlarged head 26a with a reduced diameter head bore 30a. An annular sleeve stop shoulder 34a is defined at the juncture of shank bore 28a and the reduced diameter head bore 30a.

The pin 14a has an elongated pin shank 40a which terminates in a head segment 42a at its rearward end.

The pin head segment 42a has an annular guide portion 45a which is adapted to fit snugly within the outer end of the enlarged diameter sleeve shank bore 28a. An enlarged diameter shear ring 46a prior to shearing is located immediately adjacent the guide portion 45a.

The pin head segment 42a includes the elongated reduced diameter grooved retention portion 48a which in the preinstalled condition extends rearwardly from the shear ring 46a and includes a preselected number of retention grooves 50a which are separated by retention crests 52a. The retention grooves 50a and crests 52a extend annularly.

An annular pin stop shoulder 56a is defined by the juncture of the guide portion 45a and the pin shank 40a which is of a smaller diameter. The stop shoulder 56a has an end surface which is generally planar. A lock groove or pocket 58a is adjacent the pin stop shoulder 56a. An annular breakneck groove 60a is located forwardly a preselected distance from the lock pocket 58a and defines the weakest section of the pin shank 40a and is shown as fractured in FIG. 6.

The shear ring 46a is shown as pulled into the large diameter shank bore 28a and having formed an enlarged tulip shaped blind head 61a which has the unique clamp support and lock section 66a at the blind side surface 64a.

The shear ring 46a is shown in its sheared condition with the retention portion 48 moved therein with the pin stop shoulder 56a engaged with the sleeve stop shoulder 34a and the material of the sleeve stop shoulder 34a being moved into the lock pocket groove 58a to form the forward, inner lock between the sleeve 12a and pin 14a. The pin shank 40a is shown severed at the breakneck groove 60a and the installation completed.

With the fastener 10a in the installed condition with workpieces 20'a and 22'a being of the maximum total thickness for the maximum grip condition of the fastener 10a as shown in FIG. 6, essentially all of the retention crests 52a and retention grooves 50a have been engaged with the shear ring 46a. Again at least one retention crest 52a remains on the outer side of the shear ring 46a to provide retention of the shear ring 46a within the blind head 61a to increase the strength of the blind head 61a with the clamp and lock section 66a against the inner or blind side surface 64'a of workpiece 20'a.

Thus it can be seen that the unique features of the fastener 10 can be readily adopted for use with a flush head type fastener 10a with an internal lock at the outer end and with the high strength clamp and lock section 66a of substantially uniform construction at the blind side end.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A blind type fastener for securing a plurality of workpieces including an outer workpiece having an outer side surface and an inner workpiece having an inner side surface comprising:

a hollow sleeve having a through bore, said sleeve having a sleeve shank portion and an enlarged sleeve head at one end, a pin, said pin having a pin shank portion and a pin head segment, said pin shank portion adapted to be located within said bore of said sleeve with said pin head segment located at the end of said sleeve shank portion opposite said sleeve head, said pin shank portion having a pull section opposite from said pin head segment and adapted to be gripped by an installation tool whereby a relative axial force can be applied between said pin and said sleeve for installing said fastener, said through bore of said sleeve having an enlarged bore portion in said sleeve shank portion and a reduced diameter bore portion proximate thereto and defining a radially inwardly extending sleeve stop shoulder at the juncture of said enlarged and reduced bore portions, said pin having a pin shoulder portion adjacent said pin shank portion and being of a diameter larger than that of said pin shank portion, a pin stop shoulder defined by the juncture of said pin shoulder portion and said pin shank portion, a lock groove located proximate said pin stop shoulder, said pin head segment adapted to engage said sleeve shank portion and to deform the same to form a blind head opposite said sleeve head in response to a relative axial force applied between said pin and said sleeve, said pin stop shoulder adapted to engage said sleeve stop shoulder, said pin head segment having an enlarged shear ring adapted to engage the outer end of said sleeve shank portion, said pin head segment having a reduced diameter retention portion connected to the end of said shear ring opposite from said outer end of said sleeve shank portion, said retention portion comprising a plurality of grooves and crests, said shear ring adapted to be moved into said sleeve shank portion through said outer end to form a tulip shaped blind head with a clamp and lock section at the inner side surface of the workpieces at a preselected magnitude of relative axial force and to be at a position substantially blocked from further movement at the inner side surface, said shear ring adapted to be sheared from said pin head segment at a larger magnitude of relative axial force whereby said pin shank portion will be moved through said sleeve shank portion until said pin stop shoulder engages said sleeve stop shoulder to form said lock, said shear ring being sheared across a shear plane whereby an opening is formed in said shear ring having a preselected diameter less than the diameter of said crests, as said pin shank portion is moved with movement of said shear ring blocked said retention portion is moved more or less through said shear ring with said crests engaging said shear ring to form a lock at said blind head, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve.

2. The fastener of claim 1 with said shear ring adapted to shear material from the inside surface of said enlarged bore portion of said sleeve shank portion to form a support ring with said support ring being compressed by said shear ring in said sleeve shank portion at the inner side surface of the workpieces and as a part of said clamp and lock section.

3. The fastener of claim 1 with said sleeve shank portion being of a generally uniform hardness with a section of said sleeve shank portion at the end engaged by said shear ring having a gradient of reduced hardness to facilitate movement of said shear ring into said enlarged bore portion of said sleeve shank portion for initiation of formation of said tulip shaped blind head.

4. The fastener of claim 1 with said shear ring adapted to shear material from the inside surface of said enlarged bore portion of said sleeve shank portion to form a support ring with said support ring being compressed by said shear ring In said sleeve shank portion at the inner side surface of the workpieces and as a part of said clamp and lock section, said sleeve shank portion being of a generally uniform hardness with a section of said sleeve shank portion at the end engaged by said shear ring having a gradient of reduced hardness to facilitate shearing of material from the inside surface of said enlarged bore portion to form said support ring.

5. The fastener of claim 1 with said shear ring adapted to shear material from the inside surface of said enlarged bore portion of said sleeve shank portion to form a support ring with said support ring being compressed by said shear ring in said sleeve shank portion at the inner side surface of the workpieces and as a part of said clamp and lock section, said sleeve shank portion being of a generally uniform hardness with a section of said sleeve shank portion at the end engaged by said shear ring having a gradient of reduced hardness to facilitate movement of said shear ring into said enlarged bore portion of said sleeve shank portion for initiation of formation of said tulip shaped blind head and for shearing of material from the inside surface of said enlarged bore portion to form said support ring.

6. The fastener of claim 1 with said crests of said retention portion increasing in diameter rearwardly from said shear ring.

7. The fastener of claim 1 with said crests of said retention portion increasing in diameter and width rearwardly from said shear ring.

8. The fastener of claim 1 with the outer workpiece made of a metallic material having a tensile strength of a preselected magnitude, said enlarged sleeve head being of a protruding type and having a ring portion at the radially outer end of the underside of said sleeve head adapted to engage the outer side surface of the outer workpiece, said ring portion having a bearing area providing a bearing stress with the outer side surface of at least around 40% to around 50% of the tensile strength of the material of the outer workpiece and no greater than that at which yielding of the outer side surface and/or ring portion occurs.

9. A blind type fastener for securing a plurality of workpieces including an outer workpiece having an outer side surface and an inner workpiece having an inner side surface comprising:

a hollow sleeve having a through bore, said sleeve having a sleeve shank portion and an enlarged sleeve head at one end, a pin, said pin having a pin shank portion and a pin head segment, said pin shank portion adapted to be located within said bore of said sleeve with said pin head segment located at the end of said sleeve shank portion opposite said sleeve head, said pin shank portion having a pull section opposite from said pin head segment and adapted to be gripped by an installation tool whereby a relative axial force can be applied between said pin and said sleeve for installing said fastener, said pin shank portion having a breakneck groove connecting said pull section to the remainder of said pin shank portion, said through bore of said sleeve having an enlarged bore portion and a reduced diameter bore portion proximate thereto and defining a radially inwardly extending sleeve stop shoulder at the juncture of said enlarged and reduced bore portions, said pin having a pin shoulder portion adjacent said pin shank portion and being of a diameter larger than that of said pin shank portion, a pin stop shoulder defined by the juncture of said pin shoulder portion and said pin shank portion, a lock groove located proximate said pin stop shoulder, said pin head segment adapted to engage said sleeve shank portion and to deform the same to form a blind head opposite said sleeve head in response to a relative axial force applied between said pin and said sleeve, said pin stop shoulder adapted to engage said sleeve stop shoulder, said pin head segment having an enlarged shear ring adapted to engage the outer end of said sleeve shank portion, said pin head segment having a reduced diameter retention portion connected to the end of said shear ring opposite from said outer end of said sleeve shank portion, said retention portion comprising a plurality of grooves and crests, said shear ring adapted to be moved into said sleeve shank portion through said outer and to form a tulip shaped blind head with a clamp and lock section at the inner side surface of the workpieces at a preselected magnitude of relative axial force and to be at a position substantially blocked from further movement at the inner side surface, said shear ring adapted to be sheared from said pin head segment at a larger magnitude of relative axial force whereby said pin shank portion will be moved through said sleeve shank portion until said pin stop shoulder engages said sleeve stop shoulder to form said lock, said shear ring being sheared across a shear plane whereby an opening is formed in said shear ring having a preselected diameter less than the diameter of said crests, as said pin shank portion is moved with movement of said shear ring blocked said retention portion is moved more or less through said shear ring with said crests engaging said shear ring to form a lock at said blind head, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said sleeve stop shoulder having at least a portion thereof radially separated from a radially confronting portion of said enlarged bore portion whereby radial inward movement of the material of said sleeve stop shoulder by said pin stop shoulder is facilitated and radial expansion of said sleeve stop shoulder is inhibited, said pin shank portion adapted to be severed at said breakneck groove at a relative axial force of a preselected magnitude greater than said magnitude for moving the material of said sleeve stop shoulder into said lock groove on said pin, said sleeve stop shoulder located generally within the confines of said enlarged sleeve head whereby radial expansion of said sleeve is inhibited as said sleeve stop shoulder is deformed into said lock groove, said sleeve head having a preselected axial length, said breakneck groove being located a predetermined maximum axial distance from said lock groove whereby distortion of said lock groove in response to application of said preselected magnitude of axial force is inhibited, said maximum axial distance being generally equal to said preselected axial length of said sleeve head for finally locating said lock groove and said breakneck groove generally within the confines of said sleeve head.

10. The fastener of claim 9 with said crests of said retention portion increasing in diameter rearwardly from said shear ring.

11. The fastener of claim 9 with said sleeve stop shoulder having at least a portion thereof radially separated from a radially confronting portion of said enlarged bore portion whereby radial inward movement of the material of said sleeve stop shoulder by said pin stop shoulder is facilitated and radial expansion of said sleeve stop shoulder is inhibited.

12. The fastener of claim 9 with the outer workpiece made of a metallic material having a tensile strength of a preselected magnitude, said enlarged sleeve head being of a protruding type and having a ring portion at the radially outer end of the underside of said sleeve head adapted to engage the outer side surface of the outer workpiece, said ring portion having a bearing area providing a bearing stress with the outer side surface of at least around 40% to around 50% of the tensile strength of the material of the outer workpiece and no greater than that at which yielding of the outer side surface and/or ring portion occurs.

13. A blind type fastener for securing a plurality of workpieces including an outer workpiece having an outer side surface and an inner workpiece having an inner side surface comprising:

a hollow sleeve having a through bore, said sleeve having a sleeve shank portion and an enlarged sleeve head at one end, a pin, said pin having a pin shank portion and a pin head segment, said pin shank portion adapted to be located within said bore of said sleeve with said pin head segment located at the end of said sleeve shank portion opposite said sleeve head, said pin shank portion having a pull section opposite from said pin head segment and adapted to be gripped by an installation tool whereby a relative axial force can be applied between said pin and said sleeve for installing said fastener, said pin head segment adapted to engage said sleeve shank portion and to deform the same to form a blind head opposite said sleeve head in response to a relative axial force applied between said pin and said sleeve, lock means operatively connected with said sleeve and said pin to form a front lock between said sleeve and said pin at a predetermined position between said sleeve and said pin, said pin head segment having an enlarged shear ring adapted to engage the outer end of said sleeve shank portion and being of a larger diameter than said bore at said outer end, said pin head segment having a reduced diameter retention and gripping portion connected to the end of said shear ring opposite from said outer end of said sleeve shank portion and adapted to grippingly engage said shear ring, said shear ring adapted to be moved into said sleeve shank portion through said outer end to form a tulip shaped blind head with a clamp and lock section at the inner side surface of the workpieces at a preselected magnitude of relative axial force and to be at a position substantially blocked from further movement at the inner side surface, said shear ring adapted to be sheared from said pin head segment at a larger magnitude of relative axial force whereby said pin shank portion will be moved through said sleeve shank portion until said sleeve and said pin are at said predetermined position and said front lock is formed, said shear ring being sheared across a shear plane whereby an opening is formed in said shear ring having a preselected diameter less than the diameter of said retention portion, as said pin shank portion is moved with movement of said shear ring blocked said retention and gripping portion is moved more or less through said shear ring and grippingly engaging said shear ring to form a lock at said blind head.

14. The fastener of claim 13 with:

said retention portion comprising a plurality of grooves and crests, as said pin shank portion is moved with movement of said shear ring blocked said retention portion being moved more or less through said shear ring with said crests engaging said shear ring to form a lock at said blind head.

15. The fastener of claim 13 with:

said retention portion comprising a plurality of grooves and crests, said pin shank portion is moved with movement of said shear ring blocked said retention portion being moved more or less through said shear ring with said crests engaging said shear ring to form a lock at said blind head, said crests of said retention portion being of a diameter greater than said preselected diameter formed in said shear ring and increasing in diameter rearwardly from said shear ring.

16. The fastener of claim 13 with said shear ring adapted to shear material from the inside surface of said bore at said outer end of said sleeve shank portion to form a support ring with said support ring being compressed by said shear ring in said sleeve shank portion at the inner side surface of the workpieces and as a part of said clamp and lock section.

17. The fastener of claim 13 with said sleeve shank portion being of a generally uniform hardness with a section of said sleeve shank portion at the end engaged by said shear ring having a gradient of reduced hardness to facilitate movement of said shear ring into said bore at said outer end of said sleeve shank portion for initiation of formation of said tulip shaped blind head.

18. The fastener of claim 13 with said shear ring adapted to shear material from the inside surface of said bore at said outer end of said sleeve shank portion to form a support ring with said support ring being compressed by said shear ring in said sleeve shank portion at the inner side surface of the workpieces and as a part of said clamp and lock section, said sleeve shank portion being of a generally uniform hardness with a section of said sleeve shank portion at the end engaged by said shear ring having a gradient of reduced hardness to facilitate shearing of material from the inside surface of said enlarged bore portion to form said support ring.

19. The fastener of claim 13 with said shear ring adapted to shear material from the inside surface of said bore at said outer end of said sleeve shank portion to form a support ring with said support ring being compressed by said shear ring in said sleeve shank portion at the inner side surface of the workpieces and as a part of said clamp and lock section, said sleeve shank portion being of a generally uniform hardness with a section of said sleeve shank portion at the end engaged by said shear ring having a gradient of reduced hardness to facilitate movement of said shear ring into said bore at said outer end of said sleeve shank portion for initiation of formation of said tulip shaped blind head and for shearing of material from the inside surface of said enlarged bore portion to form said support ring.

20. The blind fastener of claim 13 with said retention portion including a plurality of crests with said crests increasing in diameter rearwardly from said shear ring.

21. The blind fastener of claim 13 with said retention portion including a plurality of crests with said crests increasing in diameter and width rearwardly from said shear ring.

22. The fastener of claim 13 with the outer workpiece made of a metallic material having a tensile strength of a preselected magnitude, said enlarged sleeve head being of a protruding type and having a ring portion at the radially outer end of the underside of said sleeve head adapted to engage the outer side surface of the outer workpiece, said ring portion having a bearing area providing a bearing stress with the outer side surface of at least around 40% to around 50% of the tensile strength of the material of the outer workpiece and no greater than that at which yielding of the outer side surface and/or ring portion occurs.

23. A blind type fastener for securing a plurality of workpieces including an outer workpiece having an outer side surface and an inner workpiece having an inner side surface comprising:

a hollow sleeve having a through bore, said sleeve having a sleeve shank portion and an enlarged sleeve head at one end, a pin, said pin having a pin shank portion and a pin head segment, said pin shank portion adapted to be located within said bore of said sleeve with said pin head segment located at the end of said sleeve shank portion opposite said sleeve head, said pin shank portion having a pull section opposite from said pin head segment and adapted to be gripped by an installation tool whereby a relative axial force can be applied between said pin and said sleeve for installing said fastener, said pin head segment adapted to engage said sleeve shank portion and to deform the same to form a blind head opposite said sleeve head in response to a relative axial force applied between said pin and said sleeve, lock means operatively connected with said sleeve and said pin to form a lock between said sleeve and said pin at a predetermined position between said sleeve and said pin, said outer workpiece made of a metallic material having a tensile strength of a preselected magnitude, said enlarged sleeve head being of a protruding type and head having a ring portion at the radially outer end of the underside of said sleeve head adapted to engage the outer side surface of the outer workpiece, said ring portion having a bearing area providing a bearing stress with the outer side surface of at least around 40% to around 50% of the tensile strength of the material of the outer workpiece and no greater than that at which yielding of the outer side surface and/or ring portion occurs.

24. The fastener of claim 23 with said pin head segment having an enlarged shear ring adapted to engage the outer end of said sleeve shank portion, said pin head segment having a reduced diameter retention portion connected to the end of said shear ring opposite from said outer end of said sleeve shank portion, said retention portion comprising a plurality of grooves and crests, said shear ring adapted to be moved into said sleeve shank portion through said outer end to form a tulip shaped blind head with a clamp and lock section at the inner side surface of the workpieces at a preselected magnitude of relative axial force and to be at a position substantially blocked from further movement at the inner side surface, said shear ring adapted to be sheared from said pin head segment at a larger magnitude of relative axial force whereby said pin shank portion will be moved through said sleeve shank portion until said pin stop shoulder engages said sleeve stop shoulder to form said lock, said shear ring being sheared across a shear plane whereby an opening is formed in said shear ring having a preselected diameter less than the diameter of said crests, as said pin shank portion is moved with movement of said shear ring blocked said retention portion is moved more or less through said shear ring with said crests engaging said shear ring to form a lock at said blind head.

25. The fastener of claim 24 with said shear ring adapted to shear material from the inside surface of said bore of said sleeve shank portion to form a support ring with said support ring being compressed by said shear ring in said sleeve shank portion at the inner side surface of the workpieces and as a part of said clamp and lock section.

26. The fastener of claim 24 with said shear ring adapted to shear material from the inside surface of said bore of said sleeve shank portion to form a support ring with said support ring being compressed by said shear ring in said sleeve shank portion at the inner side surface of the workpieces and as a part of said clamp and lock section, said sleeve shank portion being of a generally uniform hardness with a section of said sleeve shank portion at the end engaged by said shear ring having a gradient of reduced hardness to facilitate movement of said shear ring into said bore of said sleeve shank portion for initiation of formation of said tulip shaped blind head and for shearing of material from the inside surface of said enlarged bore portion to form said support ring.

27. The fastener of claim 26 with said crests of said retention portion increasing in diameter and width rearwardly from said shear ring.

28. A blind type fastener for securing a plurality of workpieces including an outer workpiece having an outer side surface and an inner workpiece having an inner side surface comprising:

a hollow sleeve having a through bore, said sleeve having a sleeve shank portion and an enlarged sleeve head at one end, a pin, said pin having a pin shank portion and a pin head segment, said pin shank portion adapted to be located within said bore of said sleeve with said pin head segment located at the end of said sleeve shank portion opposite said sleeve head, said pin shank portion having a pull section opposite from said pin head segment and adapted to be gripped by an installation tool whereby a relative axial force can be applied between said pin and said sleeve for installing said fastener, said through bore of said sleeve having an enlarged bore portion in said sleeve shank portion and a reduced diameter bore portion proximate thereto and defining a radially inwardly extending sleeve stop shoulder at the juncture of said enlarged and reduced bore portions, said pin having a pin shoulder portion adjacent said pin shank portion and being of a diameter larger than that of said pin shank portion, a pin stop shoulder defined by the juncture of said pin shoulder portion and said pin shank portion, a lock groove located proximate said pin stop shoulder, said pin head segment adapted to engage said sleeve shank portion and to deform the same to form a blind head opposite said sleeve head in response to a relative axial force applied between said pin and said sleeve, said pin stop shoulder adapted to engage said sleeve stop shoulder, said pin head segment having an enlarged shear ring adapted to engage the outer end of said sleeve shank portion, said pin head segment having a reduced diameter retention portion connected to the end of said shear ring opposite from said outer end of said sleeve shank portion, said retention portion comprising a plurality of grooves and crests, said shear ring adapted to be moved into said sleeve shank portion through said outer end to form a tulip shaped blind head with a clamp and lock section at the inner side surface of the workpieces at a preselected magnitude of relative axial force and to be at a position substantially blocked from further movement at the inner side surface, said shear ring adapted to be sheared from said pin head segment at a larger magnitude of relative axial force whereby said pin shank portion will be moved through said sleeve shank portion until said pin stop shoulder engages said sleeve stop shoulder to form said lock, said shear ring being sheared across a shear plane whereby an opening is formed in said shear ring having a preselected diameter less than the diameter of said crests, as said pin shank portion is moved with movement of said shear ring blocked said retention portion is moved more or less through said shear ring with said crests engaging said shear ring to form a lock at said blind head, said pin stop shoulder and said sleeve stop shoulder having engaging surface means for directing the material of said sleeve stop shoulder substantially radially inwardly into said lock groove to lock said pin and said sleeve together and to finally form a stop surface on said sleeve for stopping axial movement of said pin through said sleeve, said shear ring adapted to shear material from the inside surface of said enlarged bore portion of said sleeve shank portion to form a support ring with said support ring being compressed by said shear ring in said sleeve shank portion at the inner side surface of the workpieces and as a part of said clamp and lock section, said sleeve shank portion being of a generally uniform hardness with a section of said sleeve shank portion at the end engaged by said shear ring having a gradient of reduced hardness to facilitate movement of said shear ring into said enlarged bore portion of said sleeve shank portion for initiation of formation of said tulip shaped blind head and for shearing of material from the inside surface of said enlarged bore portion to form said support ring, the outer workpiece being made of a metallic material having a tensile strength of a preselected magnitude, said enlarged sleeve head being of a protruding type and having a ring portion at the radially outer end of the underside of said sleeve head adapted to engage the outer side surface of the outer workpiece, said ring portion having a bearing area providing a bearing stress with the outer side surface of at least around 40% to around 50% of the tensile strength of the material of the outer workpiece and no greater than that at which yielding of the outer side surface and/or ring portion occurs.

29. The fastener of claim 28 with said enlarged bore portion of said pin shank portion at the end of said pin shank portion opposite from said sleeve head being tapered radially outwardly to a reduced thickness to facilitate initiation of movement of said shear ring into said enlarged bore portion and to facilitate initiation of shearing said support ring.

30. A blind type fastener for securing a plurality of workpieces including an outer workpiece having an outer side surface and an inner workpiece having an inner side surface comprising:

a hollow sleeve having a through bore, said sleeve having a sleeve shank portion and an enlarged sleeve head at one end, a pin, said pin having a pin shank portion and a pin head segment, said pin shank portion adapted to be located within said bore of said sleeve with said pin head segment located at the end of said sleeve shank portion opposite said sleeve head, said pin shank portion having a pull section opposite from said pin head segment and adapted to be gripped by an installation tool whereby a relative axial force can be applied between said pin and said sleeve for installing said fastener, said pin head segment adapted to engage said sleeve shank portion and to deform the same to form a blind head opposite said sleeve head in response to a relative axial force applied between said pin and said sleeve, lock means operatively connected with said sleeve and said pin to form a front lock between said sleeve and said pin at a predetermined position between said sleeve and said pin, said pin head segment having an enlarged shear ring adapted to engage the outer end of said sleeve shank portion and being of a larger diameter than said bore at said outer end, said pin head segment having a reduced diameter retention and gripping portion connected to the end of said shear ring opposite from said outer end of said sleeve shank portion and adapted to grippingly engage said shear ring, said shear ring adapted to be moved into said sleeve shank portion through said outer end to form a tulip shaped blind head with a clamp and lock section at the inner side surface of the workpieces at a preselected magnitude of relative axial force and to be at a position substantially blocked from further movement at the inner side surface, said shear ring adapted to be sheared from said pin head segment at a larger magnitude of relative axial force whereby said pin shank portion will be moved through said sleeve shank portion until said sleeve and said pin are at said predetermined position and said front lock is formed, said shear ring being sheared across a shear plane whereby an opening is formed in said shear ring having a preselected diameter less than the diameter of said retention portion, said retention portion comprising a plurality of grooves and crests, as said pin shank portion is moved with movement of said shear ring blocked said retention portion being moved more or less through said shear ring with said crests engaging said shear ring to form a lock at said blind head, said shear ring adapted to shear material from the inside surface of said bore at said outer end of said sleeve shank portion to form a support ring with said support ring being compressed by said shear ring in said sleeve shank portion at the inner side surface of the workpieces and as a part of said clamp and lock section, said sleeve shank portion being of a generally uniform hardness with a section of said sleeve shank portion at the end engaged by said shear ring having a gradient of reduced hardness to facilitate movement of said shear ring into said bore at said outer end of said sleeve shank portion for initiation of formation of said tulip shaped blind head and for shearing of material from the inside surface of said enlarged bore portion to form said support ring, the outer workpiece being made of a metallic material having a tensile strength of a preselected magnitude, said enlarged sleeve head being of a protruding type and having a ring portion at the radially outer end of the underside of said sleeve head adapted to engage the outer side surface of the outer workpiece, said ring portion having a bearing area providing a bearing stress with the outer side surface of at least around 40% to around 50% of the tensile strength of the material of the outer workpiece and no greater than that at which yielding of the outer side surface and/or ring portion occurs.

31. The fastener of claim 30 with said bore of said pin shank portion at the end of said pin shank portion opposite from said sleeve head being tapered radially outwardly to a reduced thickness to facilitate initiation of movement of said shear ring into said bore and to facilitate initiation of shearing said support ring.

* * * * *